Nov. 30, 1971     K. V. YORK ET AL     3,623,401

FLUID PRESSURE PROBE SYSTEM

Filed March 2, 1970     2 Sheets-Sheet 1

INVENTORS
KENNETH V. YORK
THOMAS M. POUCH
BY CULLEN, SETTLE,
SLOMAN & CANTOR.
ATT'YS.

United States Patent Office 3,623,401
Patented Nov. 30, 1971

3,623,401
FLUID PRESSURE PROBE SYSTEM
Kenneth V. York, Royal Oak, and Thomas M. Pouch, Farmington, Mich., assignors to Multifastener Corporation, Detroit, Mich.
Filed Mar. 2, 1970, Ser. No. 15,606
Int. Cl. B23d 15/00
U.S. Cl. 91—47
4 Claims

ABSTRACT OF THE DISCLOSURE

A fluid pressure probe system for generating a signal in response to the location of an article at a selected position at a work station. The system includes a plurality of individual differential responsive transducers connected in parallel to a common pressure manifold so that manifold pressure is normally applied to both sides of each transducer to normally maintain a zero differential pressure. A probe having a vent passage is connected to each transducer between one side of the transducer and the point of connection to the manifold. The outlet of the vent passage is normally closed by a simple ball valve seated in the end of the passage and maintained in its closed position by the pressure within the passage. The probe is mounted in the work station at a location such that the ball is unseated by the article when the article is in the desired location, thus creating a differential pressure at the transducer. A restricted orifice is located between the point of connection of the vent passage to the transducer and the point of connection of the transducer to one side of the manifold to prevent the pressure drop produced by the venting from triggering any transducers other than the one tow hich the activated probe is connected.

BACKGROUND OF THE INVENTION

The present invention was originally designed for use in a nut manufacturing process to supply a punch-press triggering signal in response to the arrival of a nut blank in position at the press. In this particular operation, a high production rate is required and capability of performance of feed rates of 10–150 nuts per minute is essential. In the past, the usual triggering system employed was a simple electrical contact which was engaged by the nut to complete an electrical circuit to supply the press triggering signal. The major draw-back of the system employing the electrical contact is that it does not have a long useful life wearing of the contacts or the contact insulation, and shorting of the contact either by metal chips or oil being commonly encountered causes malfunction.

The foregoing problems are not encountered in a fluid pressure responsive system; however, the employment of a fluid pressure system presents problems of a different nature. At production rates requiring 10–150 probe actuations per minute, it is obvious that an extremely sensitive pressure responsive device is required if the device is to shift between a "signal" and "no-signal" position in a matter of miliseconds. At the same time, in order to achieve a compact self-contained system for controlling several presses or work stations, a common pressure supply is indicated and the common connection of a plurality of extremely sensitive pressure responsive devices in a single pressure system creates the possibility that a pressure change employed to trigger one of the devices, may, through the common connection, inadvertently trigger others. For practical and economic reasons it is necessary that a system of this type be in the form of a single compact control unit which enables independent control at several different work stations. Heretofore, such a system has not been successfully produced. This invention is directed to such a system.

SUMMARY OF THE INVENTION

In accordance with the present invention, a source of air under pressure is connected to a U-shaped pressure manifold. A plurality of differential pressure responsive electrical switches are connected in parallel across the opposite legs of the manifold. In one form of commercially available differential presure responsive switch, two internal chambers are separated from each other by flexible diaphragms which, when the pressure is equalized between the two chambers, maintain a set of electrical contacts separated. Upon a reduction in pressure in one of the two chambers, the diaphragms flex to permit the electrical contacts to close to complete a controlled circuit. Commercially available switches of this type can be obtained which are designed to be responsive to a variety of different pressure signals.

In the present invention, the switches are connected with the respective chambers in communication with the opposite legs of the U-shaped pressure manifold so that under normal conditions the pressure in the two chambers is exactly the same and equal to that in the manifold. Between the manifold connection and one of the two chambers of the switch, a restricted orifice is provided, and, from a location between this orifice and the switch chamber, a conduit is connected to a probe element. The probe element consists of a fluid passageway whose outlet to atmosphere is normally closed by a ball seated in the passage outlet and maintained in its seated position by the pressure in the passage. The ball projects through the passage outlet and is located to be contacted by an article when the article is in the desired position. When engaged by the article, the ball is unseated, thus opening the vent outlet. Flow of air through the vent outlet is relatively restricted and is immediately reflected in the chamber of the associated switch. The restricted orifice prevents the pressure drop occasioned by the opening of the vent passage from being effective in the manifold and at other switches.

The employment of a high sensitivity pressure responsive switch of this type provides for actuation in response to an extremely small pressure drop. Preferably, the pressure in the manifold is maintained at approximately 40 p.s.i., and the relatively small volume of the switch chamber as compared to that of the manifold as a whole enables a momentary opening of the vent passage to almost instantaneously actuate its associated switch creating a greater pressure drop at the switch than the pressure drop in the mainfold.

Other objects and features of the invention will become apparent by reference to the following specification and the drawings:

DESCRIPTION OF THE PREFERRED EMBODIMENT

Figure 1:
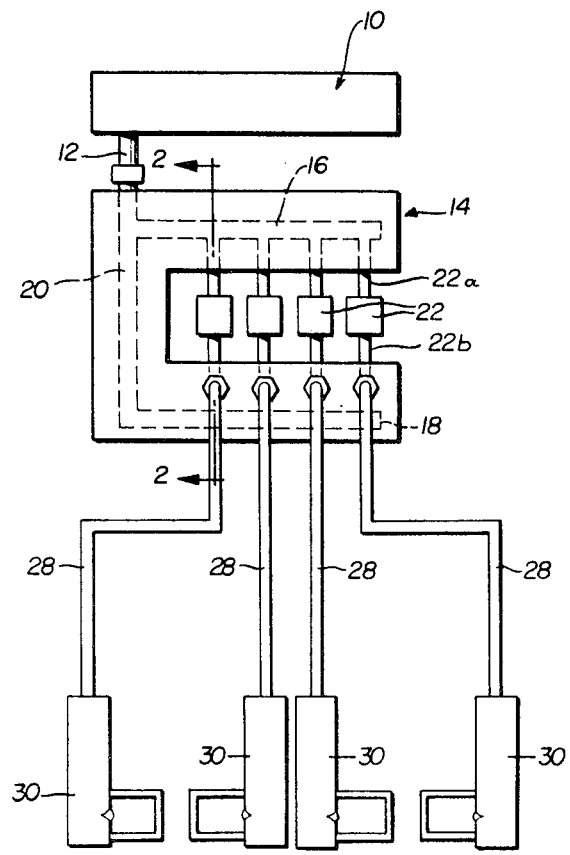
FIG. 1 is a schematic diagram of a system embodying the present invention.

Referring first to FIG. 1, a system embodying the present invention includes a schematic illustrated source of air under pressure designated generally 10 which is connected via a conduit 12 to supply air under pressure to a generally U-shaped manifold designated generally 14. In each of the legs of the U-shaped manifold 14, branch passages 16 and 18 extend along the leg, the passages 16 and 18 being commonly conected by a main passage 20 to conduit 12. A plurality of like transducers are connected in parallel between branch passages 16 and 18 in a manner to be described in more detail below. Transducers 22 take the form of a differential pressure responsive electrical switch whose contacts are maintained in an open position until a predetermined pressure differential is applied across the transducer. Each transducer 22 is connected to branch passage 16 by a conduit or passageway 22a and it is connected to the other branch passage 18 by means of a conduit or passage 22b.

Figure 2:
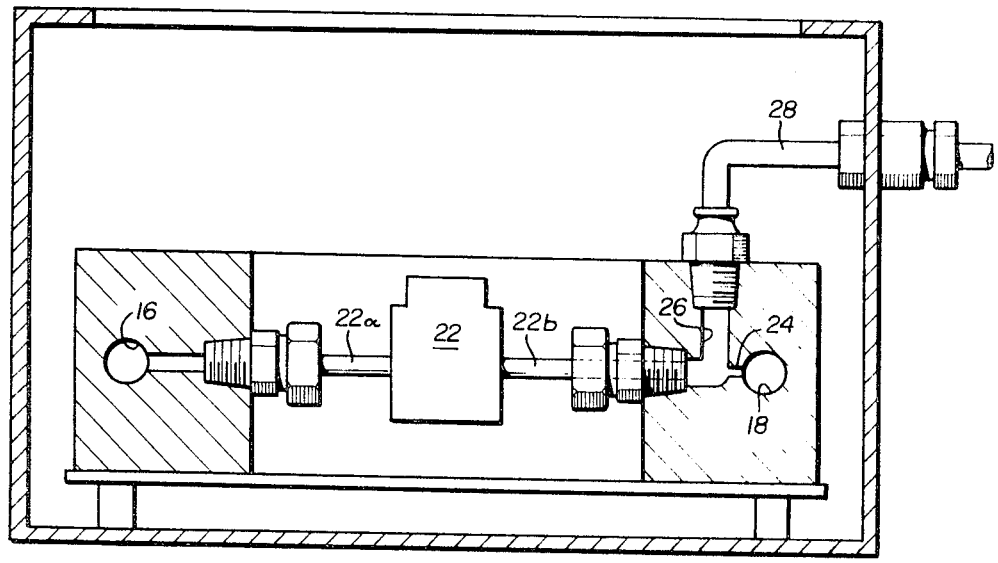
FIG. 2 is a typical cross-sectional view taken approximately on the line 2—2 of FIG. 1.

Referring now to FIG. 2, it will be seen that the passage 22a which connects the transducer 22 to the branch passage 16 is of substantially constant diameter and unrestricted. The branch passage 22b on the other hand, is provided with a relatively small diameter portion or restricted orifice at 24 so that flow of fluid under pressure between branch passage 18 and passage 22b is restricted by the orifice section 24.

As shown in FIG. 2, a relatively large diameter passage 26 branches from passage 22b at a location between the restriction 24 and transducer 22. Passage 26 is in turn connected by a conduit 28 which communicates with a probe member 30 (as best seen in FIG. 1).

Figure 3:
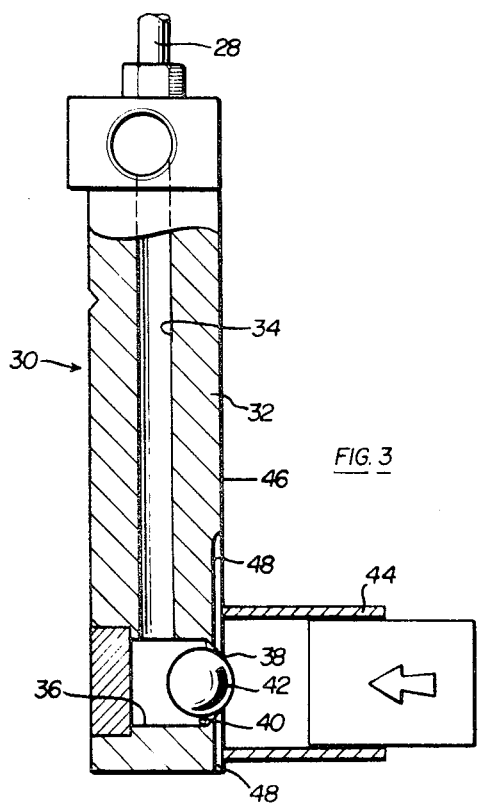
FIG. 3 is a detailed cross-sectional view of a probe of the type employed in the system of FIG. 1.
Figure 4:
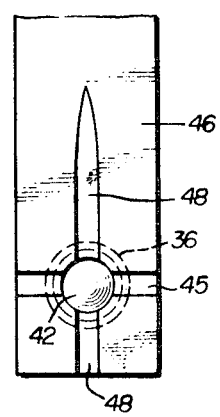
FIG. 4 is a front view of the probe ball seat.

A cross-sectional view of a probe 30 is shown in FIG. 3. The probe consists of a simple body element 32 formed with a central passage 34 which communicates with the upper end of the probe with the conduit 28. At the lower end of the probe, passage 34 is intercepted by a transverse passage 36 which opens through the side of the probe at an opening 38. Immediately inside opening 38, a conical seat 40 is formed and a ball 42 is loosely retained in passage 36. When air under pressure is supplied to passages 34 and 36, the air pressure maintains the ball 42 seated upon seat 40, thus sealing opening 38 to maintain air under pressure in the interior of the probe. As best seen in the cross-sectional view of FIG. 3, the diameter of ball 42 and opening 38 are so related to each other that when the ball is seated upon seat 40, the ball projects outwardly from the interior of the probe beyond the side surface of body 32. In FIG. 3, the probe is shown in one exemplary application in which it is mounted at one end of a chute 44 through which articles, such as nut blanks, are being fed. When so mounted, the ball 42 when in the illustrated seated position, projects into the path of nut blanks being fed through the chute 44. When the ball is engaged by a nut, the ball is forced to the left as viewed in FIG. 3, thereby unseating the ball from seat 40 to vent passages 36, 34 and conduit 28. In order to assure that the nut does not seal or close off opening 34, FIG. 4 shows the side surface 46 of the probe body 32 is formed with grooves 48 and 45 or recesses which extend from opening 38 to locations on the side surface of probe body 32 which would not be covered by the nut as it depresses or unseats ball 42.

Figure 5:
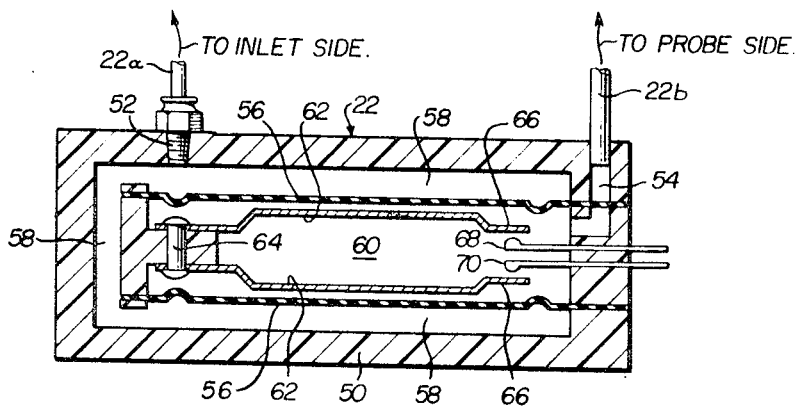
FIG. 5 is a detailed cross-sectional view, schematic in nature, of a differential pressure responsive switch employed in the present invention.

Referring now to FIG. 5, there is shown a schematic cross-sectional view of one form of transducer 22 adapted for use in the present invention. A transducer of this type is commercially available from Fairchild Controls, Hicksville, N.Y., as their low pressure sensor P.S.F. 100 A-3. This particular sensor takes the form of a closed housing 50 having two inlet passages 52 and 54. Two flexible diaphragms 56 divide the interior of housing 50 into an outer chamber 58 and an inner chamber 60. Two flexible contact arms 62 are mounted within the interior of chamber 60 closely adjacent the respective diaphragms 56. Contact arms 62 are electrically connected to each other at one end as by a mounting rivet 64, while the opposite ends 66 of contact arms 62 are normally maintained in spaced relationship to each other and also spaced relationship from two relatively rigid fixed electrical terminal members 68, 70. Terminal members 68, 70 project outwardly through the wall of housing 50, which is constructed from electrical insulating material. Inlet 52 is connected to conduit 22a, while inlet 54 is connected to conduit 22b. Inlet 52 is in communication with the outer chamber 58 of the transducer, while inlet 54 communicates with the interior chamber 60 between the two diaphragms 56.

In FIG. 5, transducer 22 is shown in a condition in which the pressure in chamber 58 is equal to the pressure in chamber 60—i.e., a zero differential pressure exists between the two chambers. If the pressure in chamber 60 is reduced, while that in chamber 58 is maintained constant, the flexible diaphragms 56 are flexed towards each other, and engage the flexible contact arm 62 to force the arms toward each other, thereby driving contacts 66 into engagement with terminals 68 and 70. This action completes an electrical circuit from the upper terminal 68 through the contacted upper arm 62, the connecting rivet 64 and back through the lower contact arm 62 to terminal 70.

This arrangement allows the transducer to achieve a high degree of sensitivity to pressure differentials between chambers 28 and 60 while at the same time rendering the device substantially insensitive to mechanical shocks or vibrations because the contact arms 62 must move toward each other to complete the electrical circuit while vibrations or mechanical shock loading will move both contact arms in the same direction so that as one contact arm is moving toward its associated terminal, the other contact arm is being driven away from its terminal. Thus, the diaphragms 56 and flexible contact arms 62 can possess a high degree of flexiblity so that a designed pressure drop in chamber 60 relative to the pressure in chamber 58 will shift the transducer from the open circuit to closed circuit condition. The P.S.F. 100 A-3 sensor manufactured by Fairchild Controls is capable of actuation at a variety of pressure differentials, for example, as low as ½ inch water column (approximately .02 p.s.i.) differential pressure between chambers 58 and 60.

Operation of the system is as follows: The probes 30 are mounted at the desired location so that the ball 42 of the probe will be unseated when the article arrives at the desired location. In the case of a nut travelling through a chute 44, the arrival of the article may be detected by a single probe, while in other cases, two or more separate probes may be employed where a more complex alignment or orientation of the article is required.

Air under pressure is supplied from pressure source 10 (FIG. 1) via conduit 12 to the main passage 20 and branch passages 16 and 18 of manifold 14. Branch passage 16 of the manifold is in direct and unrestricted communication with all of the conduits 22a of the individual transducers, and the pressure in branch passage 16 is thus transmitted via the conduits 22a and inlets 52 to the outer chambers 58 of the individual transducers 22. The pressure existing in passage 18 is likewise transmitted via the restriction 24 and conduits 22b through the inlets 54 to the internal chambers 60 of the individual transducers, thus initially establishing a zero differential pressure between chambers 58 and 60. Pressure from branch passage 18 is also transmitted via restriction 24, passage 26 and conduits 28 to the individual probe elements 30, this pressure being applied via passage 34 and passages 36 to seat the balls 42 of the probe, thereby maintaining the entire system at an equalized pressure.

When the ball 42 of one of the probes 30 is unseated, the passages 36 and 34 of the probe are vented through the opening 38 and thus reduction in pressure is transmitted via the associated conduit 28 through the passages 26 and conduit 22b and thence via inlet 54 to chamber 60. This action results in a reduction in pressure in the chamber 60, greater than the reducition in chamber 58 and the diaphragms 56 are driven by the excess pressure in outer chamber 58 to close the two contact arms 62 against terminals 68 and 70, as described above. Terminals 68 and 70 are connected into a suitable control circuit to provide the desired action in response to the unseating of the probe ball in response to the arrival of the article to the probe. The control function to be performed and the electrical circuitry and other mechanisms will vary widely in accordance with the individual application, the function of the system disclosed being to complete an electrical circuit from terminal 68 to the terminal 70 of the transducer 22 upon the unseating of the ball 42 of the connected probe 30 by the arrival of an article at the probe.

Because of the extreme sensitivity of the transducers 22, provision must be made to prevent venting of one conduit 28 by unseating of its probe ball to an adjacent conduit 28 via branch passage 18. Restriction 34 performs this function by restricting the flow of air from passage 18 to and from passage 26 and conduit 22b. When a conduit 28 is vented by the unseating of the associated ball probe, air inside chamber 60 flows outward via conduit 22b and passage 26 so that the pressure drop is almost immediately sensed in the chambers 60. Flow of air from branch passage 18 into the vented conduit 28 is, on the other hand, restricted by the restriction 24. Further, the volume of chamber 60 of an individual transducer 22 is relatively small as compared to the volume of the branch passage 18, and hence the release of a given volume of air will have a much greater effect on the pressure within chamber 60 as compared to the effect of the branch passage 18. It may also be noted that the vented passage 26 connected to an activated probe is isolated from the chamber 60 of an unactivated probe by two restrictions 24, between which exist a relatively large volume branch passage 18 which is directly connected at all times to the pressure source.

Thus, while the actuating chambers 60 of all of the individual transducers 22 are commonly connected to each other via branch passage 18, the restrictions 24 effectively isolate the probes from each other, while at the same time permitting all of the probes to be controlled from a common pressure source.

The system pressures, passage and restriction dimensions are determined by the intended application of the system. In order to obtain high actuation rates it is necessary to employ a relatively high system pressure to assure the venting of a sufficient amount of volume of air to accomplish actuation of the transducer during the extremely short time interval that the ball is depressed by the engaged article. High actuation rates can also be obtained by shortening the probe conduit 28.

In the example referred to briefly above, in which the probe is employed to detect the arrival of nut blanks at a press at rates of 10–150 nuts per minute, the following characteristics will provide an operative system. The transducers employed will be the Fairchild Controls model P.S.F. 100 A–3 sensor with pressure source 10 being regulated to supply and maintain the system at 40 p.s.i. Passage 22b preferably has an internal diameter of 3/16 of an inch, passage 26 a diameter of 1/4 of an inch, and restriction 24 has a diameter of 3/32 of an inch. Branch passage 18 is of 3/8 inch diameter.

For slower rates of actuation, a lower system pressure, or longer probe conduit 28 might be employed.

What is claimed is:

1. A fluid pressure probe system for signalling the presence of an article at selected locations comprising a source of fluid under pressure, a manifold connected to said source, a plurality of differential pressure responsive transducer means each having first and second pressure chambers and operable to produce a signal upon the existence of a predetermined differential in the pressures in the respective chambers, independent conduit means respectively connecting the first and second chamber of each of said transducer means to said manifold whereby the pressure in each of said chambers is normally equalized at the pressure existing in said manifold, one conduit being connected to said first chamber of each of said transducer means and having a restricted orifice therein between each of said first chambers and said manifold, a plurality of probe means each having a passage connected to said one conduit at a location between said orifice and said first chamber, normally closed vent valve means on each of said probe means adapted to be contacted and opened by an article when in one of said selected locations to reduce the pressure in said first chamber to establish said predetermined differential pressure between said chambers.

2. A fluid pressure probe system for signalling the presence of articles at selected locations comprising a source of fluid under pressure, a pressure manifold having a first passage connected to said source and a pair of branch passages communicating with said main passage, a plurality of pressure responsive transducer means, each having a first chamber, a second chamber, and means for producing a signal when the pressure in the first chamber exceeds the pressure in the second chamber by a predetermined amount, the first chambers of said transducers being connected to one of said branch passages, individual passage means connecting each of said second chambers to the other of said individual branch passages, means in each of said passage means defining a flow restricting orifice, individual conduit means respectively connected at one end of said passage means at a location between the second chamber and the restricted orifice, a probe having a vent passage therein communicating with the other end of each conduit means, and normally closed valve means sealing said vent passage adapted to be opened to vent said passage when said valve means is engaged by an article.

3. A system as defined in claim 2 wherein said valve means comprises a valve seat within said probe having an opening through one side of said probe, and a spherical valve member sealingly engageable with said seat to close said opening, adapted to project through said opening beyond said side of said probe when said member is seated on said seat.

4. A system as defined in claim 3 further comprising means defining a groove in said side of said probe extending from said opening to a location clear of an article contacting the probe to prevent the article from sealing the opening.

References Cited

UNITED STATES PATENTS

| | | | |
|---|---|---|---|
| 2,357,569 | 9/1944 | Wright et al. | 251—147 |
| 2,993,497 | 7/1961 | Coles et al. | 91—47 |
| 3,359,388 | 12/1967 | Houser et al. | 200—83.2 |
| 3,518,918 | 7/1970 | Keown | 91—47 |
| 2,105,196 | 1/1938 | McCauley | 92—100 |

MARTIN P. SCHWADRON, Primary Examiner

C. F. SCHIMIKOWSKI, Assistant Examiner